United States Patent [19]
Raak

[11] Patent Number: 5,701,829
[45] Date of Patent: Dec. 30, 1997

[54] APPARATUS FOR RECOVERING HEAT IN A SPENT LIQUOR RECOVERY BOILER

[75] Inventor: Keijo Raak, Varkaus, Finland

[73] Assignee: Ahlstrom Machinery Corporation, Noormarkku, Finland

[21] Appl. No.: 416,753

[22] PCT Filed: Oct. 18, 1993

[86] PCT No.: PCT/FI93/00426

§ 371 Date: Apr. 13, 1995

§ 102(e) Date: Apr. 13, 1995

[87] PCT Pub. No.: WO94/09205

PCT Pub. Date: Apr. 28, 1994

[30] Foreign Application Priority Data

Oct. 19, 1992 [FI] Finland .................. 924718

[51] Int. Cl.$^6$ ............................. F23G 7/04
[52] U.S. Cl. .............. 110/238; 110/234; 162/375; 162/36; 122/7 R
[58] Field of Search ............... 110/234, 238, 110/346; 162/30.11, 36, 29, 47, 375; 122/7 R

[56] References Cited

U.S. PATENT DOCUMENTS 2,911,284  11/1959  Hochmuth .
3,161,475  12/1964  Wilcoxson .
4,014,296  3/1977   Astrom .
4,462,319  7/1984   Larsen .................. 110/238
5,450,803  9/1995   Svensk et al. ............. 110/346
5,478,440  12/1995  Paju ...................... 110/238 X

FOREIGN PATENT DOCUMENTS

WO 93/05228  3/1993  WIPO .

Primary Examiner—Henry A. Bennett
Assistant Examiner—Susanne C. Tinker
Attorney, Agent, or Firm—Nixon & Vanderhye P.C.

[57] ABSTRACT

An apparatus for use in the pulp industry for recovering heat in the spent liquor recovery boiler, whereby the boiler walls are formed of water-cooled tubes connected to the water/steam circulation system of the boiler. Supply of air into the lower section of the furnace is effected symmetrically through air ports which are disposed at equal distances from the center of the furnace. The lower section of the furnace is preferably cylindrical and connected to a separate cooling medium circulation system.

19 Claims, 1 Drawing Sheet

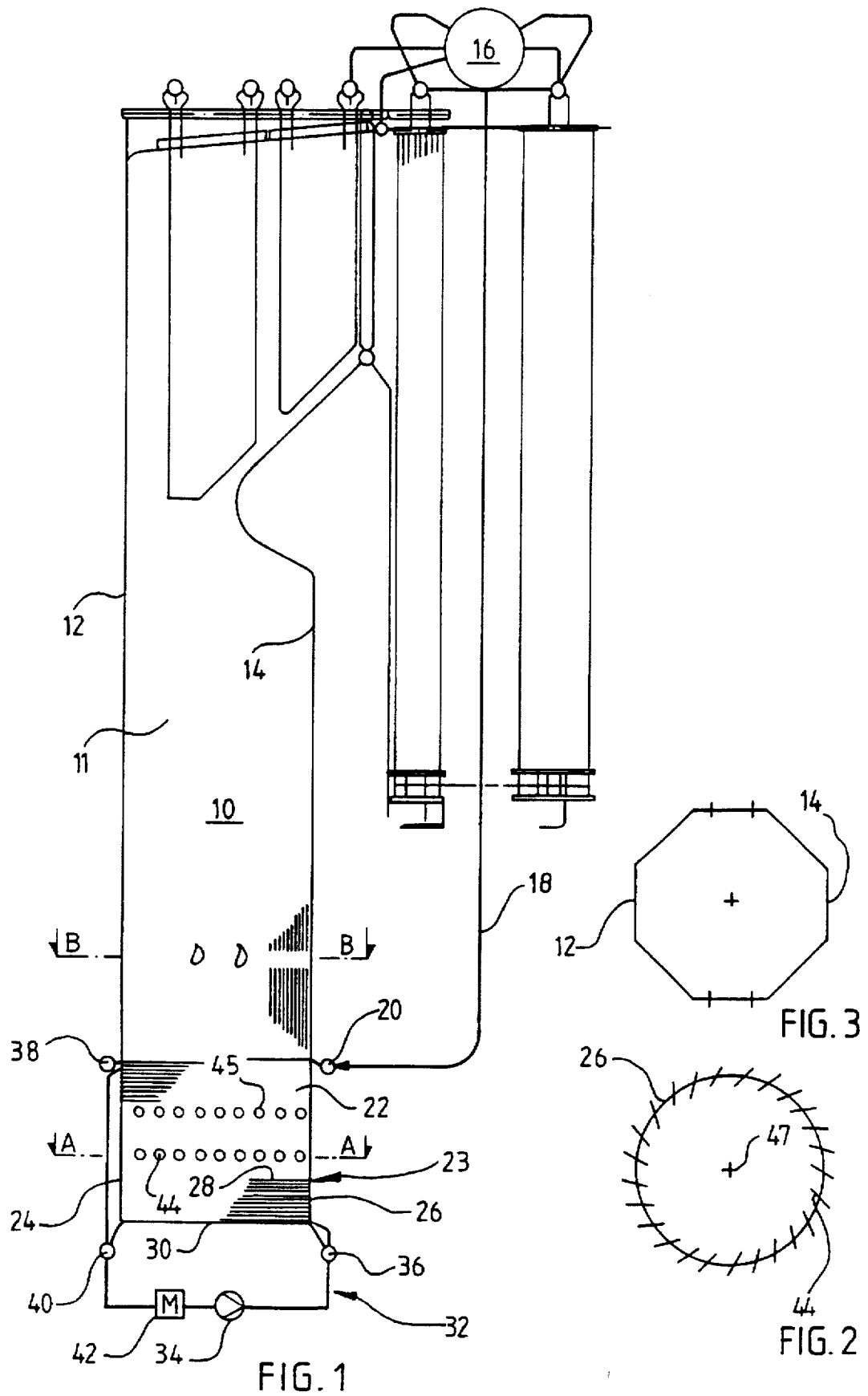

APPARATUS FOR RECOVERING HEAT IN A SPENT LIQUOR RECOVERY BOILER

The present invention relates to an apparatus for use in the pulp industry for recovering heat in a spent liquor recovery boiler, such as a soda recovery boiler, whereby the boiler walls are formed of water-cooled tubes connected to the water/steam circulation system of the boiler.

Recovery and regeneration of cooking chemicals effected in the soda recovery boiler are an essential part of the pulp manufacturing processes. Organic substances dissolved in the spent liquor are combusted, thereby generating heat which is utilized in steam generation. The inorganic matter, i.e., ash contained in the spent liquor, melts at the high temperature prevailing in the soda recovery boiler and flows as melt downwardly onto the bottom of the furnace. The soda recovery boiler also serves as a steam boiler, where heat released during combustion is recovered as steam, primarily by water tubes lining the boiler walls and as high-pressure super-heated steam of, e.g. 450° to 480° C./65 to 85 bar, by superheaters disposed in the upper section of the boiler. The temperature rises very high, often to over 1000° C., inside the furnace of the soda recovery boiler, whereby the conditions in the furnace are highly corroding due to the temperature and the alkali and sulphur compounds contained in the spent liquor.

These special circumstances set constructive demands on the structure of the soda recovery boiler, such demands being different from those set on conventional power plant boilers. In the furnace structures presently used, the whole bottom and walls of the furnace are water cooled in order to prevent the temperature at the tubes from rising to a level favourable to corrosion.

The lower section of the furnace and the bottom of the soda recovery boiler are made of water cooled tubes, which constitute part of the pressurized section of the boiler. Due to the structure of the bottom and the lower section of the furnace, there is natural circulation of water in the bottom tubes, i.e., the circulation is effected by the difference of density. The boiler water is led at a high pressure and, e.g., over 300° C. temperature below the bottom of the furnace, to the distributing pipe, wherefrom the water is then distributed into the the bottom and wall tubes. In the lower section of the furnace, water first flows nearly horizontally or obliquely upwardly in the bottom tubes and then further upwardly through wall tubes to the upper section of the boiler.

The natural circulation sets limits to the structure of the furnace and bottom of the boiler because all tubes should be either vertical or at least rising. Furthermore, the natural circulation structure complicates the free layout and shaping of the melt discharge openings and air ports.

Proper water circulation is of crucial importance to the operational safety of the boiler. If the water circulation is disturbed, it may result in overheating of the tube material, and consequently corrosion and tube damage. Great changes in the tube temperature may cause disturbances in the water circulation. Especially in the bottom tubes, where water flows nearly horizontally, even a relatively small disturbance in the water circulation may be fatal.

A bed is formed on the bottom of the furnace, composed of material remaining in the spent liquor after the evaporable and easily combustible substances have been discharged during the pyrolysis stage. The bed contains, e.g., coal/coke, sodium and sulphur. On the bottom of the bed, near the bottom tubes of the furnace, there is a layer of melt formed of inorganic chemicals. This layer of melt flows out of the furnace through an opening or openings in the furnace wall.

The lowermost portion of the layer of chemicals, which is in direct contact with the water-cooled bottom tubes of the furnace, is normally in a solid state due to the cooling effect of the tubes. This solid layer protects the water tubes.

Formation of the solid layer onto the bottom of the furnace may be disturbed by temperature variation in the furnace, shallowness of the bed, unfavourable inclination of the bottom of the furnace or by poor cooling effect of the boiler tubes. In some cases, the state of the layer nearest to the tubes may vary between solid and molten states, whereby the tubes are sometimes covered with a solid and sometimes with a molten layer of chemicals, and sometimes at least of portion of them is totally without any protecting layer thereon.

For reasons described above, the bottom tubes of the boiler may be damaged. For example, fractures or cracks may appear, wherethrough water then finds its way and leaks out of the tubes into the chemical melt. This brings about a danger of a violent explosion between water and melt, i.e., a melt explosion. Such explosions sometimes occur and material damages may rise to millions of Finnmarks. Repairs of the damages may take months, which results in considerable production losses. Sometimes melt explosions have also claimed human lives.

Because of the danger of explosion, the bottom tubes of the boiler have to be inspected frequently in order to discover in good time whether the bottom tubes have corroded or otherwise damaged and whether they therefore have to be replaced or repaired. Spent liquor combustion and steam generation of the soda recovery boiler have to be stopped during the inspection, which is why the inspections should be as infrequent as possible.

Efforts have been made to decrease the danger of damage and explosion by using tube material which better resists corrosion, or by covering the bottom tubes by refractory material or coating them by corrosion resistant metal to be sprayed on the tubes.

The lower section of the furnace and the bottom of the soda recovery boiler are today generally constructed of compound tube. The compound tube is made of carbon steel and coated with a thin, protective layer of austenitic steel. This structure provides a fairly good protection against corrosion of the wall tube. However, the danger of explosion or other damage has not been completely avoided. Inspections of boilers have revealed cracks and signs of corrosion in compound bottom tubes also under the coating material. Stress or fatigue corrosion is considered to be the cause of cracks. Compound, which is about ten times as expensive as ordinary carbon steel, has not proved to be a final solution for the furnace and bottom material. Unfortunately, the inspection itself may contribute to a damage to the tubes because the protective layer coating the tubes has to be removed for the time of inspection.

An essential change has taken place in use of the soda recovery boilers during the past few years as the dry content of the fuel, i.e. black liquor, has increased. Thus, the effective thermal value of the fuel is higher than before, which clearly raises the combustion temperature. This phenomenon is as such positive with regard to the boiler operation, but it also adds to the thermal stress on the furnace walls and often causes hot corrosion of inefficiently cooled areas; in other words, it increases potential risks.

Further, it has been noted that so-called rotation firing has given good results when used in soda recovery boilers. In rotating firing, combustion air is introduced into the furnace in such a manner that the flue gases are caused to circulate in a tangential direction. As a result, air mixes efficiently with combusting gases and brings about highly effective combustion. However, intensified combustion further raises the temperature of the lower section of the furnace, which as such has a positive effect with regard to chemical recovery. The high temperature, however, further contributes to formation of thermal stresses in the wall tubes of a conventional furnace.

An object of the present invention is to provide a better apparatus than those described above for heat recovery in a spent liquor recovery boiler.

Primarily, it is an object of the present invention to provide a lower section of the furnace in a recovery boiler, by which lower section of the furnace efficient and safe combustion can be achieved.

It is a still further object of the present invention to provide a structure forming the lower section of the recovery boiler furnace, which is easier and faster to replace.

For achieving the objects mentioned hereinabove, it is a characteristic feature of the apparatus according to the invention that the lower section of the recovery boiler furnace is in the shape of a vertical cylinder, whereby the air ports disposed in the walls of the lower section are at equal distances from the center of the furnace.

According to the invention, primary and/or secondary airs may thus be simply led to the lower section of the furnace tangentially so that a favourable turbulent motion is provided in the combustion zone. Thus, reactions in the combustion zone take place as efficiently as possible and entirely burnt compounds are discharged into the upper section of the furnace for heat recovery. A high temperature prevails in the lower section of the furnace, whereby chemical reactions are at their most effective, and a reduction of sulphur compounds as well as small flue gas emissions are resulted.

Risks, such as tube damages, melt explosion danger and stresses in construction, caused by the higher temperature provided by rotation firing, may be minimized by arranging the furnace with a separate lower section, which has a cooling medium circulation system of its own, which is not in direct communication with the actual high-pressure water/steam circulation system of the boiler.

When the lower section of the soda recovery boiler is cooled by using a cooling circulation system separate from the boiler water/steam circulation system, it is possible to use cooling mediums other than water, for example, air, other inert gas, or some liquid or, at the cooling temperature of the bottom, molten metal such as zinc. The separate cooling circulation system may also use water, but in order to ensure efficient cooling, this water circulation system has a lower pressure and temperature than the actual water/steam circulation system of the boiler. Effective steam generation is also strived for with this system.

A separately cooled lower section of the furnace is provided so that the tubes forming the furnace bottom and the lower section of the walls together are separated from the boiler water circulation system and connected to a separate cooling medium circulation system.

According to a preferred embodiment of this invention, a separately cooled, cylindrical lower section and bottom of the furnace may be constructed of tubes similar or nearly similar to those used for the conventional, presently used furnace bottoms. On the other hand, the lower section and bottom of the furnace may also be constructed of tubes larger or smaller than the wall tubes of the furnace itself or alternatively of tubes or canals, the cross section of which is, e.g., square or rectangular. In accordance with a preferred embodiment of the invention, the wall tubes in the lower section of the furnace are substantially horizontal and arranged to run spirally to form the wall of the lower section of the furnace.

In accordance with a preferred embodiment of the invention, the bottom of the recovery boiler and a portion of the furnace are a separate unit, which is cooled by a water circulation system of its own. The water circulation is preferably performed at a pressure which is considerably lower than that of the soda recovery boiler, for example, at <30 bar. When the water circulation system of the bottom and the lower section of the boiler is of a forced circulation type, it is possible to freely choose the bottom shape, position of bottom and wall tubes, and layout and shape of the openings in the wall even though the water circulation in the upper section of the boiler is effected by a conventional natural circulation. Thereby, it is possible to provide air feed into the furnace, which is as favourable as possible in view of combustion, and mixing in the furnace, which is as efficient as possible; in other words, a complete rotation firing much strived for is achievable.

By constructing the bottom and the lower section of the furnace so that their pressure is clearly lower than that in the rest of the boiler, it is ensured that all parts susceptible to a heavy thermal stresses will be efficiently cooled. The material chosen for the bottom and the lower section of the furnace may be inexpensive pressure vessel carbon steel, which is known to be well resistant to corrosion caused by chemicals and to thermal stress when the pressure and the surface temperature are low enough, preferably less than 30 bar and 250° C.

The heat recovered to a separate cooling medium circulation system may be used, e.g., for heating the boiler feed water in a separate heat exchanger, which is connected with the cooling medium circulation system by a separate cooling circulation system, whereby the heat released from the cooling of the lower section of the furnace is recovered. Thereby, it is possible to maintain the temperature of the medium flowing in the lower section of the separately cooled furnace nearly constant by regulating the cooling effect of the heat exchanger in the cooling circulation system. The temperature of the cooling medium flowing in the cooling circulation system of the boiler according to the invention is preferably regulated so that it causes the thermal expansion of the separately cooled lower section of the furnace to correlate with the thermal expansion of the walls within the boiler water/steam circulation systems, i.e., no sealing problems exist between the separately cooled lower section and the other furnace structure and no gas or chemical leakages occur between the parts.

The furnace bottom constructed on the forced circulation principle also offers more freedom as to the layout and shape of the required air ports in comparison with the present construction. As known, a round air port is the most preferred solution as to permeability of air. Adjustment of a round port is easier than a generally used slot-shaped port in order to achieve the desired pressure. The structure based on mere natural circulation has not allowed use of round ports, whereas the forced circulation structure allows practically all shapes of ports. With forced circulation boilers according to the invention, the tube and fin dimensions may be chosen within a much wider range than with natural circulation boilers and the areas under the heaviest thermal stress can be better protected.

In accordance with the arrangement described above, the pressurized section of the soda recovery boiler is a two-part structure. The lower section of the furnace, which is under a lower pressure, is preferably round, i.e. cylindrical, and vertical. The lower section may also be a polygon, for example, an octagon or a decagon, resembling a cylindrical shape. The upper section of the furnace may be round, but preferably it is angular to better facilitate arrangement of the heat transfer surfaces; and to make fitting of the lower section easier, it is preferably a polygon, e.g. a hexagon. Thereby, the round lower section and the high-pressure section more easily form a tight structure. The structure of the part of the high-pressure section above the junction is similar to the structure of present boilers, except for having six angles. Depending on how high up the low-pressure section extends, compound wall tubes may be used in the high-pressure section, preferably in accordance with the present recommendations.

When the lower section of the boiler is provided with a separate cooling medium circulation system, the replacement of bottom of the high-pressure boiler, which is necessary every now and then, takes place faster. The lower section of the boiler according to the invention may be built as a compact unit at a workshop, and the installation thereof is considerably faster in comparison with earlier known constructions, where the bottom is connected tube by tube to the wall structure. The manufacturing costs of a separate, cylindrical lower section are low.

Most preferably, the construction according to the invention applies to new boilers, where the upper section of the furnace is in the shape of a polygon, most preferably a hexagon. This provides the best possible connection between the round and angular parts of the furnace. Also, when bottoms of present boilers are repaired, it is possible to install new, round lower sections for the furnaces.

The arrangment of the invention provides efficient combustion and chemical recovery with a structure which is easy to make safe and to replace without having to touch the actual boiler water circulating tubes.

The invention is described in greater detail in the following, with reference to the accompanying drawings, in which FIG. 1 is a schematic vertical section of a recovery boiler having a bottom arrangment according to the invention.

FIG. 2 is a horizontal cross-section of the lower section of the recovery boiler of FIG. 1 taken along line A—A, and FIG. 3 is a horizontal cross section of the upper section of the recovery boiler of FIG. 1 taken along line B—B.

FIG. 1 shows a soda recovery boiler provided with a two-part furnace 10 according to the invention. The walls 12 and 14 of the upper section 11 of the furnace, showing in the FIG. are water walls formed of vertical water tubes by welding them together. The water/steam circulation in the upper section is arranged by natural circulation, whereby the water/steam mixture formed in the tubes rises upwardly via headers into a steam drum 16. From the steam drum, hot water flows via downcomers 18 to the distributing tubes 20 of the water walls.

The lower section 22 of the furnace is formed of tube walls 24 and 26 connected to a separate cooling medium circulation system 23. The tube walls 24 and 26 are substantially horizontal tubes one on top of each other; in FIG. 1, tube 28 is spirally wound.

The furnace bottom 30 is also formed of horizontal tubes. The wall tubes of the lower section and the bottom tubes are connected to the cooling medium circulation system 23 arranged outside the furnace. Cooled medium is led by pump 34 to a header 36, wherefrom the medium is then distributed into the tube walls of the lower section and to the tubes of the furnace bottom. The medium heated in the walls of the lower section is collected in a header 38. Therefrom the mixture and heated medium from the tubes of the furnace bottom are introduced into a lower header 40.

From the header 40, the heated medium is taken to a heat exchanger 42 of the cooling circulation system 32 for heat recovery. From the heat exchanger, the cooled medium is returned by pump 34 to the circulation system 23.

Air ports 44 and 45 for primary and secondary airs are provided in the lower section walls of the furnace.

The lower section of the boiler is cross-sectionally round, as shown in FIG. 2, indicating a horizontal cross section of the furnace of FIG. 1, taken along line A—A. FIG. 2 shows schematically the primary air ports 44, which are disposed symmetrically at equal distances from the center of the furnace 47 and which are so directioned that the in-flowing air brings about a vortex in the boiler.

It is also possible to have either one or more than two air levels arranged in the same way tangentially. As mentioned above, the shape of air ports is preferably round. Besides the round one, also other resembling shapes, e.g., an elliptic shape, are applicable.

FIG. 3 shows a horizontal cross section of the upper section of the soda recovery boiler of FIG. 1. The cross section of the upper section of the boiler is a hexagon and thus relatively easy to fit in with the round lower section of the furnace.

It is not an intention to limit the invention to the embodiments described hereinabove, but it may be applied within the inventive scope defined by the accompanying claims.

I claim:

1. Apparatus for use in the pulp industry for recovering heat in a spent liquor recovery boiler comprising: a recovery boiler having a furnace and a water steam circulation system, and having boiler walls that are formed of water-cooled tubes connected to said water/steam circulation system; a lower section of said boiler furnace in the shape of a vertical cylinder, which is a polygon in cross-section; and air ports disposed in said boiler walls of said polygon cross-section lower section, said air ports spaced substantially equal distances from a center point of said furnace lower section; and an upper section of said furnace which is a polygon in cross-section.

2. Apparatus as recited in claim 1 wherein both primary and secondary air ports are disposed in said lower section of said furnace.

3. Apparatus as recited in claim 1 wherein said lower section of said boiler comprises a bottom and walls that are farmed as a separate structure, and which is connected to a cooling medium circulation system distinct from said boiler steam circulation system.

4. Apparatus as recited in claim 3 wherein said lower section of said furnace is formed of water walls connected to a distinct forced circulation system of cooling medium distinct from said boiler steam/circulation system, and wherein said distinct system has a pressure that is lower than the pressure in said water/steam circulation system of said boiler.

5. Apparatus as recited in claim 3 wherein said lower section of said furnace is formed of water walls which are connected to a separate cooling medium circulation system distinct from said boiler system/circulation system and in which the cooling medium is air or inert gas.

6. Apparatus as recited in claim 3 wherein said lower section of said furnace is defined by water walls connected to a separate cooling medium circulation system distinct from said boiler steam/circulation system and in which the cooling medium is a liquid other than water.

7. Apparatus as recited in claim 3 wherein said lower section of said furnace, and an upper section of the furnace, are detachable from each other.

8. Apparatus as recited in claim 3 wherein said lower section of said furnace is an octagon or a decagon in cross-section.

9. Apparatus as recited in claim 1 wherein said lower section of said furnace is an octagon or a decagon in cross-section.

10. Apparatus as recited in claim 1 wherein said air ports of said lower section of said boiler are circular in cross-section.

11. Apparatus for use in the pulp industry for recovering heat in a spent liquor recovery boiler comprising:

- a recovery boiler having a furnace, and a water steam/circulation system, and having boiler walls that are formed of water cooled tubes connected to said water/steam circulation system;
- a lower section of said boiler furnace in the shape of a vertical cylinder;
- air ports disposed in said boiler walls of said lower section spaced substantially equal distances from a center point of said furnace; and
- wherein said lower section of said boiler comprises bottom end walls that are formed as a separate structure, and which is connected to a cooling medium circulation system distinct from said boiler/steam circulation system.

12. Apparatus as recited in claim 11 wherein said lower section of said furnace is formed of water walls connected to a separate distinct forced circulation system of cooling medium distinct from said boiler steam/circulation system, and wherein said distinct system has a pressure that is lower than the pressure in said water/steam circulation system of said boiler.

13. Apparatus as recited in claim 11 wherein said lower section of said furnace is formed of water walls which are connected to a separate cooling medium circulation system distinct from said boiler system/circulation system and in which the cooling medium is air or inert gas.

14. Apparatus as recited in claim 11 wherein said lower section of said furnace is defined by water walls connected to a separate cooling medium circulation system distinct from said boiler steam/circulation system and in which the cooling medium is a liquid other than water.

15. Apparatus as recited in claim 11 wherein said lower section of said furnace, and an upper section of said furnace, are detachable from each other.

16. Apparatus as recited in claim 11 wherein both primary and secondary air ports are disposed in said lower section of said furnace.

17. Apparatus as recited in claim 11 wherein said lower section of said furnace is an octagon or a decagon in cross-section.

18. Apparatus as recited in claim 11 wherein an upper section of said furnace is a polygon in cross section and said air ports are spaced substantially equal distances from a center point of said furnace.

19. Apparatus as recited in claim 11 wherein said air ports of said lower section of said boiler are circular in cross-section.

* * * * *